United States Patent

Umemoto

(10) Patent No.: US 10,023,241 B2
(45) Date of Patent: Jul. 17, 2018

(54) AIR FLOW ADJUSTING STRUCTURE FOR VEHICLE

(71) Applicant: TOYOTA JIDOSHA KABUSHIKI KAISHA, Toyota-shi (JP)

(72) Inventor: Akira Umemoto, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/257,339

(22) Filed: Sep. 6, 2016

(65) Prior Publication Data

US 2017/0073024 A1 Mar. 16, 2017

(30) Foreign Application Priority Data

Sep. 10, 2015 (JP) ................................. 2015-178724

(51) Int. Cl.
*B62D 25/16* (2006.01)
*B62D 25/18* (2006.01)
*B62D 37/02* (2006.01)

(52) U.S. Cl.
CPC ........... *B62D 25/161* (2013.01); *B62D 25/18* (2013.01); *B62D 37/02* (2013.01)

(58) Field of Classification Search
CPC ...... B62D 25/16; B62D 35/02; B62D 25/025; B62D 35/00; B62D 25/18; B62D 37/02; B62D 25/161
USPC ..................................................... 296/180.1
See application file for complete search history.

(56) References Cited

U.S. PATENT DOCUMENTS

| | | | | | |
|---|---|---|---|---|---|
| 3,341,222 | A | * | 9/1967 | Roberts | B62D 25/16 280/851 |
| 4,436,319 | A | * | 3/1984 | Clutter | B62D 25/168 280/851 |
| 5,100,177 | A | * | 3/1992 | Becker | B62D 25/168 280/851 |
| 5,460,411 | A | * | 10/1995 | Becker | B62D 25/168 280/848 |
| 5,697,644 | A | * | 12/1997 | Logan | B60R 13/04 280/848 |
| 5,961,148 | A | * | 10/1999 | Cheng | B62D 25/16 280/848 |
| 6,712,425 | B2 | * | 3/2004 | Brulhart | B62D 25/18 296/180.1 |
| 7,810,828 | B2 | * | 10/2010 | Sugiyama | B62D 25/161 280/152.05 |
| 8,276,971 | B2 | * | 10/2012 | Hirano | B62D 25/16 180/903 |

(Continued)

FOREIGN PATENT DOCUMENTS

AU 2008298470 B2 7/2011
JP 57-29482 U 2/1982

(Continued)

*Primary Examiner* — Pinel E Romain
(74) *Attorney, Agent, or Firm* — Oblon, McClelland, Maier & Neustadt, L.L.P.

(57) ABSTRACT

An air flow adjusting structure for a vehicle includes: a fender liner provided above a tire in a vehicle vertical direction, the fender liner including an arch such that an air flow passage is formed between the arch and the tire; and an adjusting rib projecting from the arch in a vehicle-downward direction, the adjusting rib being inclined relative to a vehicle-width direction, and extending in a direction that intersects with a vehicle-longitudinal direction.

10 Claims, 6 Drawing Sheets

(56) References Cited

U.S. PATENT DOCUMENTS

| | | | | |
|---|---|---|---|---|
| 8,844,971 | B2* | 9/2014 | Tanaka | B62D 25/161 280/847 |
| 2003/0160472 | A1* | 8/2003 | Xia | B60K 13/02 296/65.09 |
| 2015/0246697 | A1 | 9/2015 | Kishima et al. | |

FOREIGN PATENT DOCUMENTS

| | | |
|---|---|---|
| JP | 60-52181 U | 4/1985 |
| JP | 5-238427 A | 9/1993 |
| JP | 2003-54451 A | 2/2003 |
| JP | 2008-247146 A | 10/2008 |
| JP | 2009-67158 | 4/2009 |
| JP | 2009-143255 | 7/2009 |
| JP | 2014-58182 | 4/2014 |

* cited by examiner

AIR FLOW ADJUSTING STRUCTURE FOR VEHICLE

INCORPORATION BY REFERENCE

The disclosure of Japanese Patent Application No. 2015-178724 filed on Sep. 10, 2015 including the specification, drawings and abstract is incorporated herein by reference in its entirety.

BACKGROUND

1. Field of the Disclosure

The present disclosure relates to an air flow adjusting structure for a vehicle.

2. Description of Related Art

Japanese Patent Application Publication No. 2009-143255 below discloses a fender liner having a flow adjusting groove to guide air. The air introduced from rearward of a wheel house into the wheel house. This straightening groove guides the air from rearward of the wheel house to frontward thereof, and continuously discharges the air from discharge flow passages split at a frontward position to the outside in a vehicle-width direction.

SUMMARY

The groove and the plural discharge flow passages are required in the fender liner described in JP 2009-143255 A, which makes the structure complicated.

The present disclosure provides a air flow adjusting structure for a vehicle to adjust air in a wheel house with a simple configuration.

An air flow adjusting structure for a vehicle according to an aspect of the disclosure includes: a fender liner provided above a tire in a vehicle vertical direction, the fender liner including an arch such that an air flow passage is formed between the arch and the tire; and an adjusting rib projecting from the arch in a vehicle-downward direction, the adjusting rib being inclined relative to a vehicle-width direction, and extending in a direction that intersects with a vehicle-longitudinal direction.

In the above aspect, the adjusting rib may extend across the air flow passage in the vehicle-width direction.

In the aspect of the disclosure, the adjusting rib may be provided at a top of the arch.

In the air flow adjusting structure for the vehicle of the above aspect, the air introduced from the vehicle-front side into the air flow passage collides against the adjusting rib from the vehicle-front side, and is brought to flow toward one of an inner side or an outer side in the vehicle-width direction. The air introduced from the vehicle-rear side into the air flow passage collides against the adjusting rib from the vehicle-rear side, and is brought to flow toward the other of the inner side and the outer side in the vehicle-width direction.

According to the above aspect, it is possible to straighten the air introduced from the vehicle-front side into the air flow passage, and the air introduced from the vehicle-rear side into the air flow passage so as to be discharged in respective different directions by using the adjusting rib having such a simple configuration of projecting from the top of the arch in the vehicle-downward direction.

In the above aspect, a front end of the adjusting rib may be located at an outer end of the adjusting rib in the vehicle-width direction, and a rear end of the adjusting rib may be located at an inner end of the adjusting rib in the vehicle-width direction.

In the above aspect, the air introduced from the vehicle-front side into the air flow passage collides against the adjusting rib, flows in the vehicle-rearward direction, and is discharged inward in the vehicle-width direction. On the other hand, the air introduced from the vehicle-rear side into the air flow passage collides against the adjusting rib, flows in the vehicle-frontward direction, and is discharged outward in the vehicle-width direction. According to the above aspect, it is possible to smoothly guide the air introduced from frontward of the vehicle-lateral part into the inner side in the vehicle-width direction toward the inner side in the vehicle-width direction. Air with a greater flow amount coming from the rear side is allowed to flow outward in the vehicle-width direction, thereby effectively adjusting the air in the air flow passage.

In the above aspect, an angle of the inclination in an extending direction of the adjusting rib relative to the vehicle-width direction may be within a range from 30° to 60°.

In the above aspect, the arch may include a groove extending in the vehicle-longitudinal direction, and projecting upwardly in the vehicle vertical direction. The groove may include an inner wall portion and an outer wall portion, between the inner wall portion and the outer wall portion. The inner wall portion may be located inward in the vehicle-width direction, and the outer wall portion may be located outward in the vehicle-width direction. The adjusting rib may be provided in the groove, the rear end may be connected to the inner wall portion, and the front end may be provided to be apart from the outer wall portion.

In the above aspect, the groove may be provided at an upper part of the arch. The upper part of the arch may be located within a range from the highest position of the arch in the vehicle vertical direction to a position at ±40°.

In the above aspect, in the inner side in the vehicle-width direction of the adjusting rib, it is possible to effectively avoid collision between the air flow coming from the rear side and the air flow coming from the front side. Meanwhile, in the outside in the vehicle-width direction of the adjusting rib, it is possible to allow air with a greater flow amount coming from the rear side to smoothly flow from the space to the outwardly front side in the vehicle-width direction.

The aspect may include a reinforcement rib coupled to the adjusting rib, and projecting downwardly from the arch in the vehicle vertical direction to reinforce the adjusting rib.

According to the above aspect, the adjusting rib is reinforced by reinforcement ribs, and thus it is possible to suppress damages to the adjusting rib due to collision of flying stones and others.

In the above aspect, the reinforcement rib may be provided on a front wall surface of the adjusting rib, the front wall surface facing a vehicle-front side.

According to the above aspect, it is possible to obtain a desired strength by adjusting the number and the thickness of the reinforcement ribs provided on the surface of the adjusting rib that faces the vehicle-front side without providing reinforcement ribs on the surface of the adjusting rib that faces the vehicle-rear side. Accordingly, it is possible to reinforce the adjusting rib as well as effectively allow air with a greater flow amount flowing from the vehicle-rear side to flow along the surface located on the rear portion of the adjusting rib that is maintained to be a flat surface.

In the above aspect, a projecting height of the reinforcement rib projecting from the arch may be smaller than a projecting height of the adjusting rib projecting from the arch.

In the above aspect, the adjusting rib may be a separate body from the fender liner.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
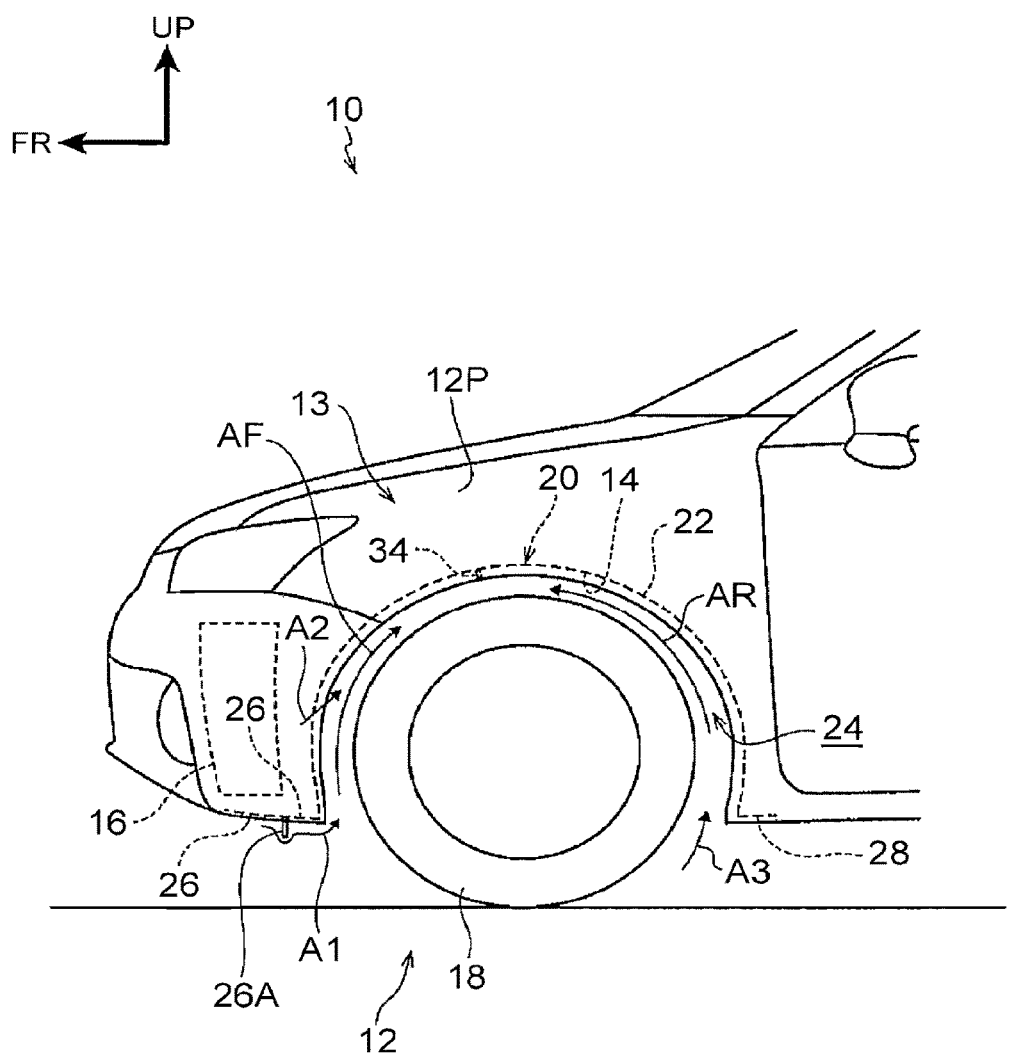
FIG. 1 is a side view of a front part of a vehicle according to an embodiment of the present disclosure.

An embodiment of the present disclosure will be described using drawings. In the drawings, a vehicle-frontward direction is indicated by an arrow FR, an outward direction in the vehicle-width direction is indicated by an arrow OUT, and a vehicle-upward direction is indicated by an arrow UP.

As shown in FIG. 1, an air flow adjusting structure for a vehicle 12 of the present disclosure is provided on a fender 13 of a vehicle 10. In the present embodiment, the fender 13 on the front left of the vehicle will be illustrated and described, but the same air flow adjusting structure for the vehicle may also be applicable to a fender on the front right of the vehicle.

A front bumper 16 is provided at a front end of the vehicle 10, and the fender 13 is provided at an outer end of a rear part of the front bumper 16 in the vehicle-width direction. A wheel house 14 is formed inward of the fender 13 in the vehicle-width direction, and a fender liner 20 is fixed to an inside of the wheel house 14.

Figure 2:
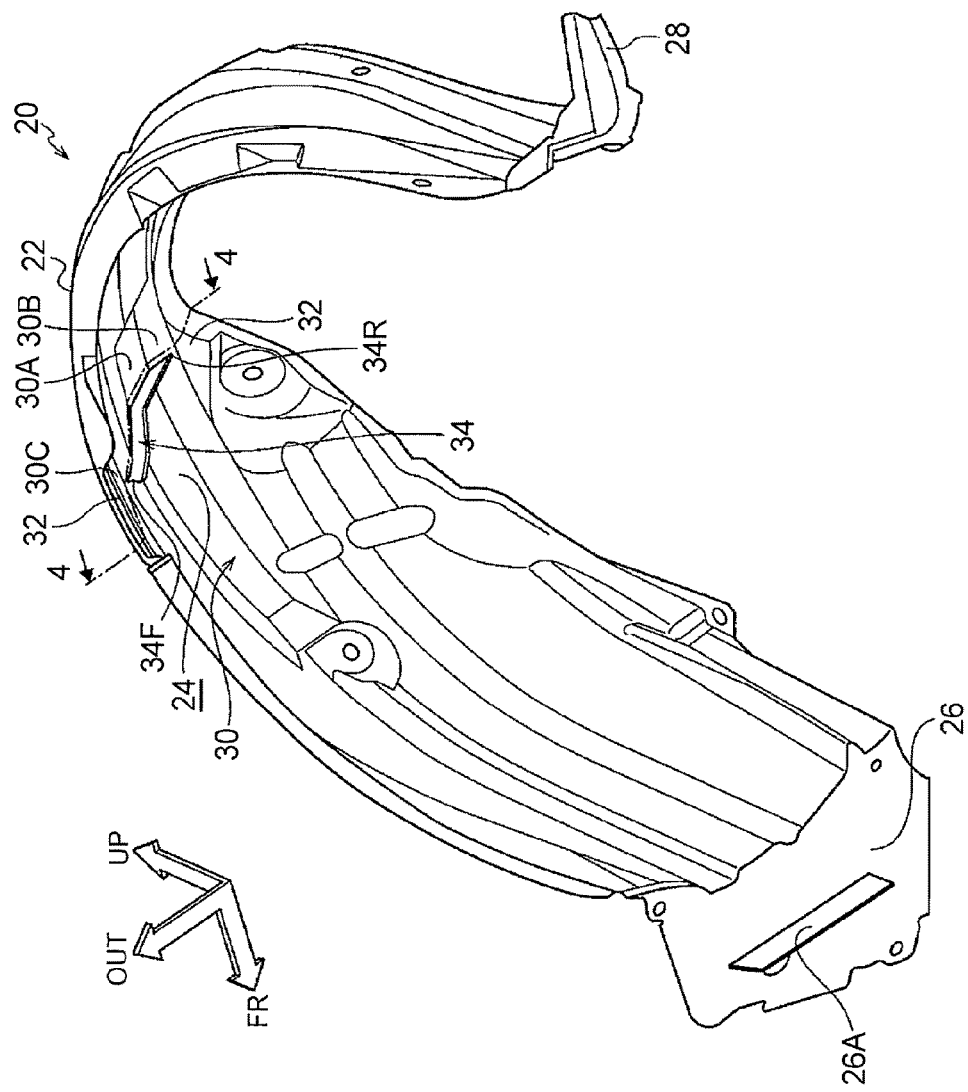
FIG. 2 is a perspective view of a fender liner according to the present embodiment of the present disclosure, as viewed from below in an obliquely rearward direction.

As shown in FIG. 2, the fender liner 20 includes an arch 22, and the arch 22 is formed in a substantially semi-circular shape that opens in a vehicle-downward direction in a side view. As shown in FIG. 1, a tire 18 is disposed radially inward of the arch 22 in a side view. The arch 22 covers the tire 18 from a vehicle-upper side in a manner as to allow the tire 18 to be steered. Through this, an upper part of the wheel house 14 is partitioned by the arch 22. An outer edge in the vehicle-width direction of the arch 22 is combined to a fender panel 12P configuring a design surface of the vehicle.

Inside the wheel house 14, a space is formed between the arch 22 and the tire 18, and this space is used as an air flow passage 24. The air flow passage 24 is formed so as to extend from a front end of the arch 22 along the arch 22 to a rear end of the arch 22.

Figure 3:
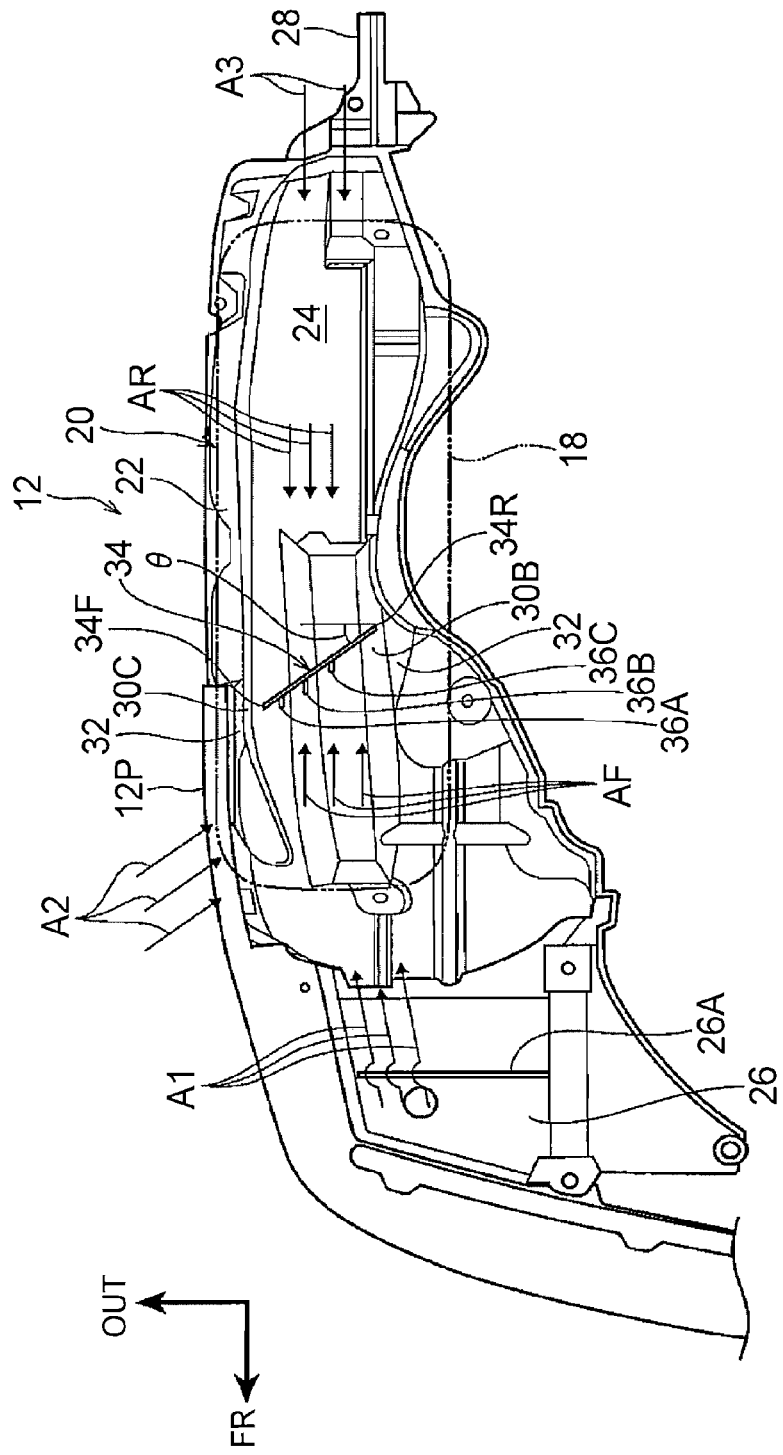
FIG. 3 is a plan view of a air flow adjusting structure for a vehicle according to the present embodiment of the present disclosure, as viewed from below.

As shown in FIG. 2 and FIG. 3, a frontward-bent end 26 that is bent toward the vehicle-frontward direction is formed at a vehicle-front end of the fender liner 20. A spat 26A is formed to a lower surface of the frontward-bent end 26. The spat 26A projects downward from the lower surface of the frontward-bent end 26. A rearward-bent end 28 that is bent toward the vehicle-rearward direction is formed at a vehicle-rear end of the fender liner 20.

Figure 4:
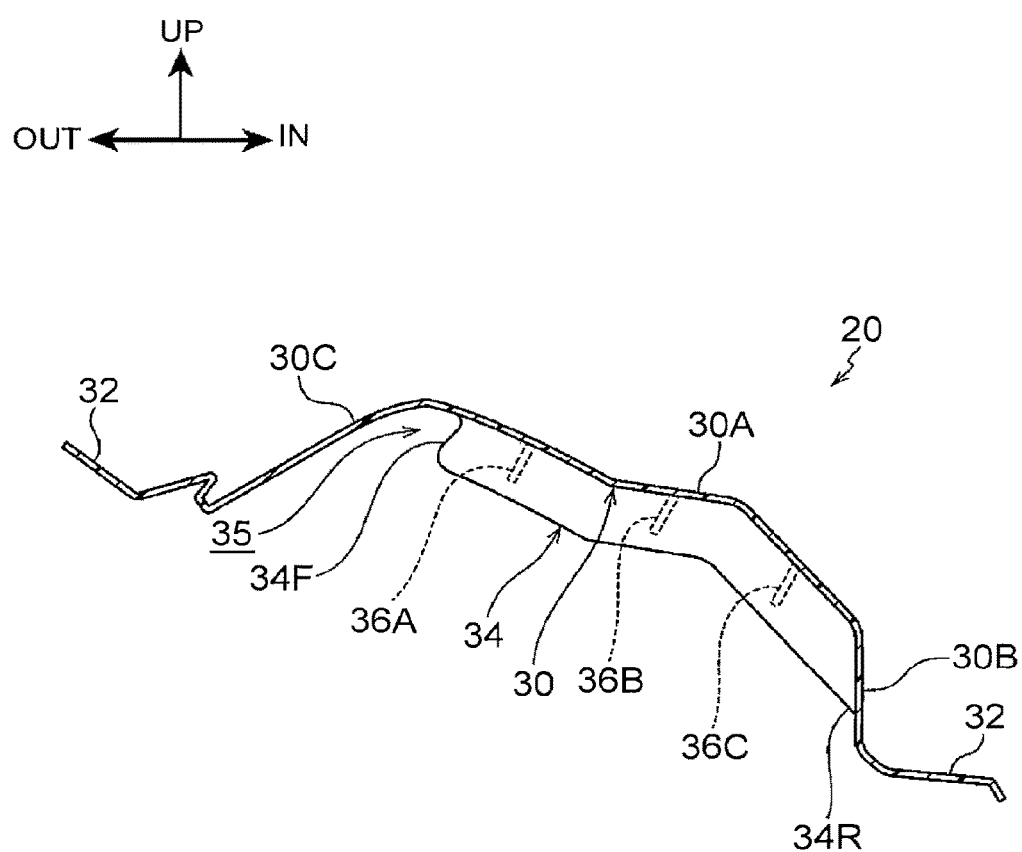
FIG. 4 is a sectional view taken along line 4-4 of FIG. 2.

A downward groove 30 is formed to an upper part of the arch 22 in a manner as to extend in a vehicle-longitudinal direction. Herein, the upper part of the arch may be within a predetermined range from a highest position in a vehicle-vertical direction of the arch, for example, within a range from the highest position in the vehicle-vertical direction of the arch 22 to a position at ±40° relative to a shaft of the tire 18. As shown in FIG. 4, the downward groove 30 is configured by a bottom portion 30A, an inner wall portion 30B located inward in the vehicle-width direction, and an outer wall portion 30C located outward in the vehicle-width direction. A lower end of each of the inner wall portion 30B and the outer wall portion 30C is provided with a flange 32 that is bent outward of the downward groove 30. A section of the upper part in the vehicle-width direction of the arch 22 is formed to be substantially a hat shape.

A adjusting rib 34 is formed in the downward groove 30. A top of the arch 22 is defined to be within a range from its highest position in the vehicle-vertical direction to a position at ±20° relative to the shaft of the tire 18. The adjusting rib 34 is formed within a range from the top of the arch 22, that is, the highest position in the vehicle-vertical direction of the arch 22 to a position at ±20° relative to the shaft of the tire 18. The adjusting rib 34 is configured to project downward, and extend across the air flow passage 24.

Figure 5:
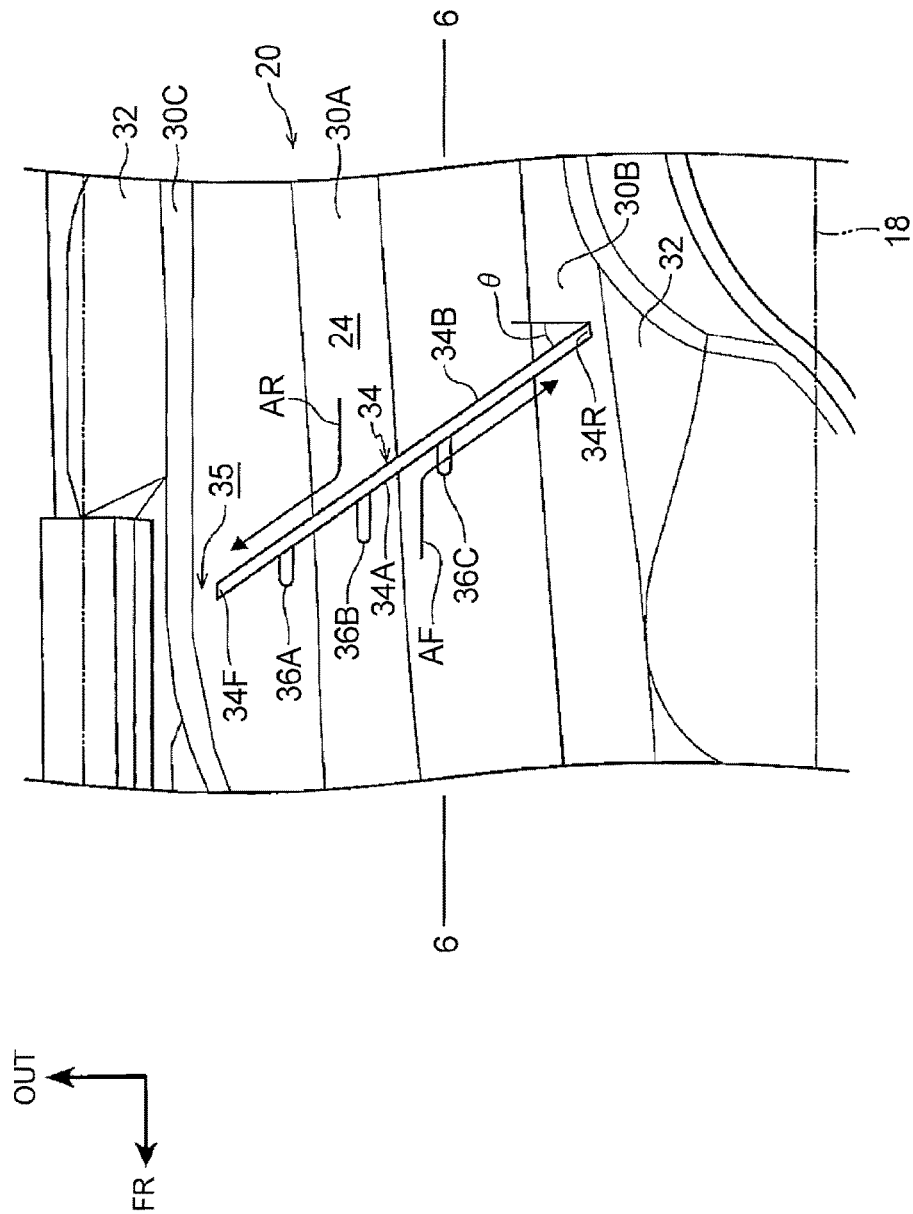
FIG. 5 is an enlarged view enlarging a vicinity of a adjusting rib of FIG. 3.
Figure 6:
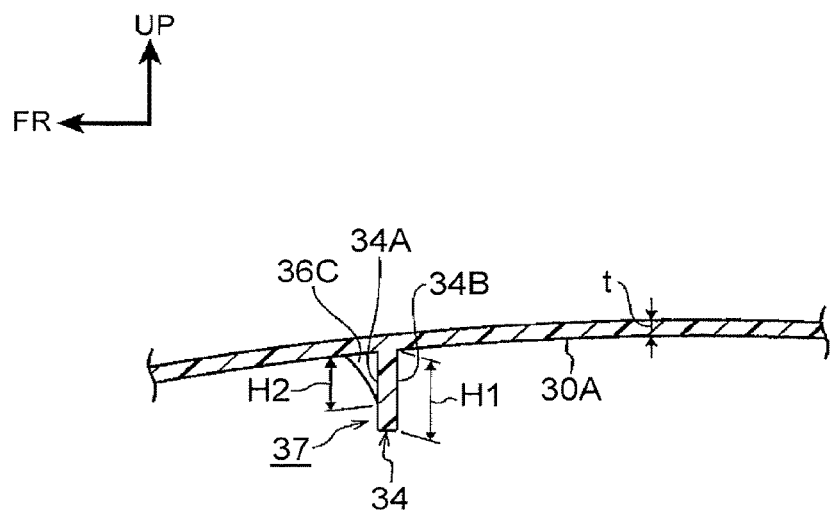
FIG. 6 is a sectional view taken along line 6-6 of FIG. 5.

As shown in FIG. 5 and FIG. 6, the adjusting rib 34 includes a front wall surface 34A facing a vehicle-front side and a rear wall surface 34B facing a vehicle-rear side. The front wall surface 34A and the rear wall surface 34B are formed so as to stand at an angle of approximately 90° relative to the bottom portion 30A. In order to hinder air flows AF, AR described later from passing over the adjusting rib 34, it is preferable to set a projecting height H1 of the adjusting rib 34 projecting from the bottom portion 30A to be ten times as thick as a thickness t of the bottom portion 30A or more, for example, 15 mm or more.

As shown in FIG. 3, the adjusting rib 34 is arranged such that a front end 34F thereof is located outward in the vehicle-width direction, and a rear end 34R thereof is located inward in the vehicle-width direction. The adjusting rib 34 is inclined at an angle θ relative to the vehicle-width direction. This means that an extending direction of the adjusting rib 34 is inclined at the angle θ relative to the vehicle-width direction. Hence, the adjusting rib 34 is inclined inward in the vehicle-width direction as the adjusting rib 34 extends from the front end 34F located outward in the vehicle-width direction to the vehicle-rearward direction. It is preferable to set this angle θ to be within a range from 30° to 60°, more preferable approximately 45° for the purpose of smoothening the air flow AF and the air flow AR.

The front end 34F of the adjusting rib 34 is apart from the outer wall portion 30C of the downward groove 30 so that a space 35 is formed therebetween. The rear end 34R of the adjusting rib 34 is connected to the inner wall portion 30B of the downward groove 30.

There are formed reinforcement ribs 36A, 36B, 36C on the front wall surface 34A of the adjusting rib 34. The reinforcement ribs 36A, 36B, 36C are disposed apart from one another in the order of the reinforcement rib 36A, the reinforcement rib 36B, and the reinforcement rib 36C from the outer side in the vehicle-width direction. The reinforcement ribs 36A, 36B, 36C are connected to the front wall surface 34A, respectively, and project downward from the bottom portion 30A. As shown in FIG. 6, each of the reinforcement ribs 36A, 36B, 36C is formed in a triangular shape of which apex is located closer to the top of the adjusting rib 34, as viewed in the vehicle-width direction.

A projecting height H2 of each of the reinforcement ribs 36A, 36B, 36C from the bottom portion 30A is smaller than the projecting height H1 of the adjusting rib 34. Accordingly, a wall-end flow passage 37 where no reinforcement rib 36A, 36B, 36C is formed to an upper portion of the front wall surface 34A of the adjusting rib 34. Each wall-end flow passage 37 is formed to be a flat surface having no reinforcement rib along the vehicle-width direction. Each of the reinforcement ribs 36A, 36B, 36C extends in an extending direction of the air flow passage 24 as viewed from the vehicle-lower side.

The adjusting rib 34 and the reinforcement ribs 36A, 36B, 36C are integrally formed with the fender liner 20.

Operation and effects of the present embodiment will be described, hereinafter.

As shown in FIG. 1 and FIG. 3, in the above configured vehicle 10, the air A1 introduced from the vehicle-front side into the air flow passage 24, and the air A2 introduced from an outer side in the vehicle-width direction into the air flow passage 24 generate the air flow AF. The air introduced from the vehicle-front side is guided toward the outer side in the vehicle-width direction by the spat 26A and others provided at the front part of the vehicle. Hence, inflow amount of the air to the air flow passage 24 after passing over the spat 26A and others becomes smaller than inflow amount of the air flow AR introduced from the vehicle-rear side described later. As shown in FIG. 5, the air flow AF collides against the front wall surface 34A of the adjusting rib 34, flows along the front wall surface 34A, and then flows out toward the inwardly vehicle-rear side in the vehicle-width direction.

During traveling, as shown in FIG. 1 and FIG. 3, an air A3 is further introduced from the vehicle-rear side into the air flow passage 24 by rotation of the tire 18, thereby generating the air flow AR. As shown in FIG. 5, the air flow AR collides against the rear wall surface 34B of the adjusting rib 34, flows along the rear wall surface 34B, and then flows toward the outwardly vehicle-front side in the vehicle-width direction.

In the present embodiment, the adjusting rib 34 guides the air flow AF introduced from the vehicle-front side, and flowing through the air flow passage 24 toward the rear side, and the air flow AR introduced from the vehicle-rear side, and flowing through the air flow passage 24 toward the front side to be discharged in respective different directions in the vehicle-width direction. As aforementioned, it is possible to adjust both the air flow AF and the air flow AR by using the adjusting rib 34 having such a simple configuration of projecting in the vehicle-downward direction from the top of the arch 22. Accordingly, it is possible to suppress disturbance of the air flows due to collusion between the air flow AF and the air flow AR in the air flow passage 24, thereby enhancing steering stability.

The adjusting rib 34 of the present embodiment is inclined such that the front end 34F is disposed outward in the vehicle-width direction, and the rear end 34R is disposed inward in the vehicle-width direction; therefore, the air flow AF coming from the vehicle-front side is allowed to flow inward in the vehicle-width direction, and the air flow AR coming from the vehicle-rear side is allowed to flow outward in the vehicle-width direction. The air flow AR with a greater flow amount is allowed to flow outward in the vehicle-width direction, thereby suppressing disturbance of the air flows inward in the vehicle-width direction. The air flow AF is allowed to flow inward in the vehicle-width direction by the air A2 introduced into the air flow passage 24 from the outer side in the vehicle-width direction; therefore, by allowing the air flow AF to flow inward in the vehicle-width direction, the air inside the air flow passage 24 can be smoothly guided.

In the present embodiment, the rear end 34R of the adjusting rib 34 is coupled to the inner wall portion 30B of the downward groove 30. Therefore, the adjusting rib 34 is able to effectively suppress the collusion between the air flow AF and the air flow AR occurred inward in the vehicle-width direction. Meanwhile, the space 35 is formed between the front end 34F of the adjusting rib 34 and the outer wall portion 30C; therefore, in the outside in the vehicle-width direction, it is possible to allow the air flow AR with a greater flow amount coming from the rear side to smoothly flow toward the outwardly front side in the vehicle-width direction.

In the present embodiment, the front wall surface 34A and the rear wall surface 34B are provided so as to stand at an angle of approximately 90° relative to the bottom portion 30A, thereby hindering the air flow AF and the air flow AR from passing over the adjusting rib 34, and thus the air inside the air flow passage 24 can be effectively straightened.

In addition, in the present embodiment, the reinforcement ribs 36A, 36B, 36C are formed so as to reinforce the adjusting rib 34, thereby suppressing damage to the adjusting rib 34 due to flying stones, and flood driving, etc.

In the present embodiment, the reinforcement ribs 36A, 36B, 36C are provided on the front wall surface 34A, and the rear wall surface 34B is formed to be flat. Hence, it is possible to reinforce the adjusting rib 34 as well as effectively straighten the air flow AR with a greater flow amount coming from the vehicle-rear side along the rear wall surface 34B.

In the present embodiment, the wall-end flow passage 37 is formed to the upper portion of the front wall surface 34A of the adjusting rib 34. Accordingly, it is possible to allow the air flow AF to smoothly flow along the upper portion of the front wall surface 34A.

In the present embodiment, the adjusting rib 34 is inclined relative to the vehicle-width direction such that the front end 34F is disposed outward in the vehicle-width direction, and the rear end 34R is disposed inward in the vehicle-width direction; but the respective positions of the front end 34F and the rear end 34R in the vehicle-width direction may be reversely arranged so as to set the adjusting rib 34 to be inclined in a reverse direction. Even if the adjusting rib is arranged in this direction, it is also possible to suppress the collision of the air flows inside the air flow passage 24, thus promoting enhancement of steering stability, compared with the case of having no adjusting rib.

Figure 7:
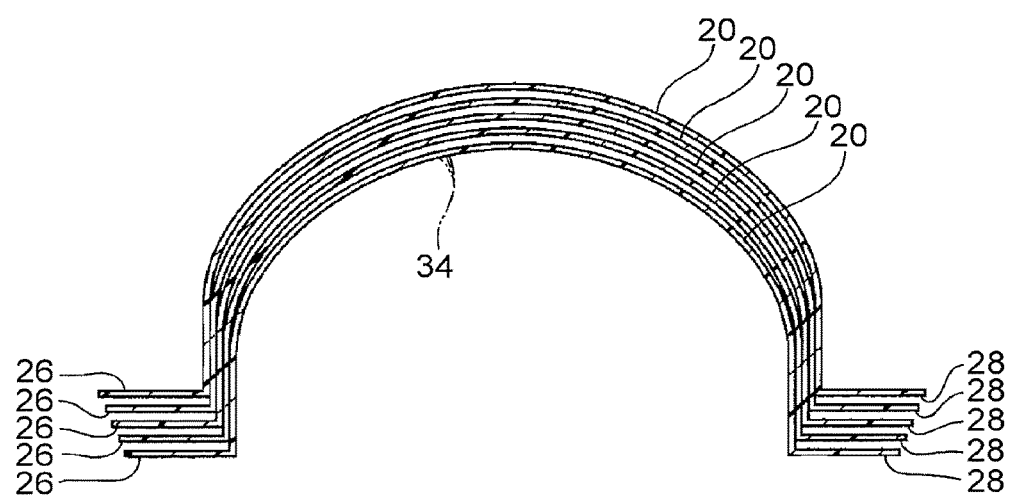
FIG. 7 is an explanatory view showing a state in which only fender liners are stacked when the fender liners are separate bodies from adjusting ribs.

In the present embodiment, the adjusting rib 34 is integrally formed with the fender liner 20, but the adjusting rib 34 may be formed to be a separate body from the fender liner 20. The configuration of separately forming the adjusting rib realizes that plural fender liners 20 having no adjusting ribs 34 attached thereto can be stacked without being disturbed by the adjusting ribs 34 when the plural fender liners 20 are conveyed, as shown in FIG. 7. Accordingly, the plural fender liner 20 can be conveyed in a compact condition.

It may be configured that the front end 34F is formed to be an upper end in the vehicle-vertical direction of the adjusting rib 34, and the rear end 34R is formed to be an lower end in the vehicle-vertical direction of the adjusting rib 34. In this case, the air introduced from the vehicle-front side into the air flow passage collides against the adjusting rib from the vehicle-front side, and then flows in the vehicle-downward direction. The air introduced from the vehicle-rear side into the air flow passage collides against the adjusting rib from the vehicle-rear side, and then flows in the vehicle-upward direction. In this case, it is preferable to form a vent port in a rear portion in the vehicle-longitudinal direction of the front end 34F of the adjusting rib 34. Through this, it is possible to release the air introduced from the vehicle-rear side into the air flow passage toward the vehicle-upward direction.

What is claimed is:

1. An air flow adjusting structure for a vehicle comprising:
  a fender liner provided above a tire in a vehicle vertical direction, the fender liner including an arch such that an air flow passage is formed between the arch and the tire; and
  an adjusting rib projecting from the arch in a vehicle-downward direction, the adjusting rib extending between a front end of the adjusting rib and a rear end of the adjusting rib in an extending direction which is inclined relative to both a vehicle-width direction and a vehicle-longitudinal direction,
  wherein one of the front end of the adjusting rib and the rear end of the adjusting rib is disposed further forward in the vehicle-longitudinal direction than the other of the front end of the adjusting rib and the rear end of the adjusting rib,
  wherein the arch includes a groove extending in the vehicle-longitudinal direction, and projecting upwardly in the vehicle vertical direction, the groove includes an inner wall portion and an outer wall portion, between the inner wall portion and the outer wall portion, the inner wall portion is located inward in the vehicle-width direction, and the outer wall portion is located outward in the vehicle-width direction, and
  wherein the adjusting rib is provided in the groove, the rear end is connected to the inner wall portion, and the front end is provided to be apart from the outer wall portion.

2. The air flow adjusting structure for the vehicle according to claim 1, wherein
  the adjusting rib extends across the air flow passage in the vehicle-width direction.

3. The air flow adjusting structure for the vehicle according to claim 1, wherein
  the adjusting rib is provided at a top of the arch.

4. The air flow adjusting structure for the vehicle according to claim 1, wherein
  the front end of the adjusting rib is located at an outer end of the adjusting rib in the vehicle-width direction, and
  the rear end of the adjusting rib is located at an inner end of the adjusting rib in the vehicle-width direction.

5. The air flow adjusting structure for the vehicle according to claim 4, wherein
  an angle of the inclination in the extending direction of the adjusting rib relative to the vehicle-width direction is within a range from 30° to 60°.

6. The air flow adjusting structure for the vehicle according to claim 1, wherein
  the groove is provided at an upper part of the arch, and
  the upper part of the arch is located within a range from the highest position of the arch in the vehicle vertical direction to a position at ±40°.

7. An air flow adjusting structure for a vehicle comprising:
  a fender liner provided above a tire in a vehicle vertical direction, the fender liner including an arch such that an air flow passage is formed between the arch and the tire;
  an adjusting rib projecting from the arch in a vehicle-downward direction, the adjusting rib extending between a front end of the adjusting rib and a rear end of the adjusting rib in an extending direction which is inclined relative to both a vehicle-width direction and a vehicle-longitudinal direction; and
  a reinforcement rib coupled to the adjusting rib, and projecting downwardly from the arch in the vehicle vertical direction to reinforce the adjusting rib,
  wherein one of the front end of the adjusting rib and the rear end of the adjusting rib is disposed further forward in the vehicle-longitudinal direction than the other of the front end of the adjusting rib and the rear end of the adjusting rib.

8. The air flow adjusting structure for the vehicle according to claim 7, wherein
  the reinforcement rib is provided on a front wall surface of the adjusting rib, the front wall surface facing a vehicle-front side.

9. The air flow adjusting structure for the vehicle according to claim 7, wherein
  a projecting height of the reinforcement rib projecting from the arch is smaller than a projecting height of the adjusting rib projecting from the arch.

10. The air flow adjusting structure for the vehicle according to claim 1, wherein
  the adjusting rib is a separate body from the fender liner.

* * * * *